Sept. 1, 1964          O. J. MUNZ          3,146,802

THREE-DIMENSIONAL LINEAR CAM, METHOD AND APPARATUS

Filed Aug. 6, 1959          6 Sheets-Sheet 1

INVENTOR.

Otto John Munz.

Sept. 1, 1964          O. J. MUNZ          3,146,802

THREE-DIMENSIONAL LINEAR CAM, METHOD AND APPARATUS

Filed Aug. 6, 1959          6 Sheets-Sheet 2

INVENTOR.

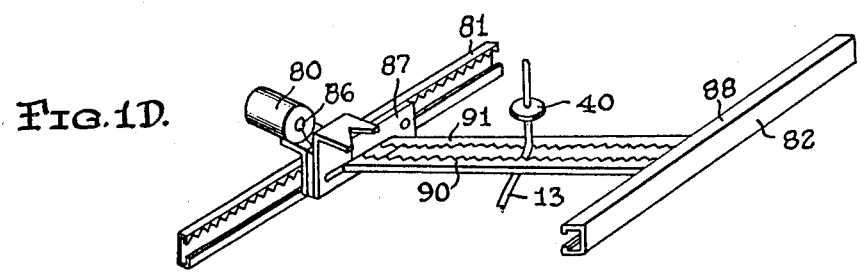
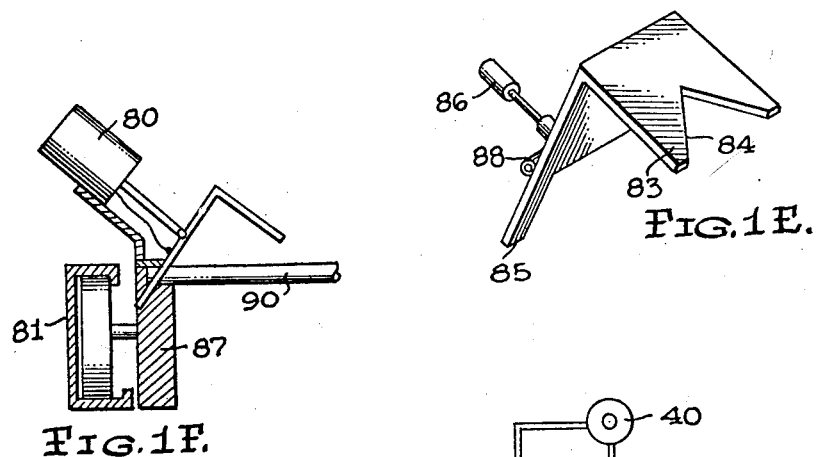
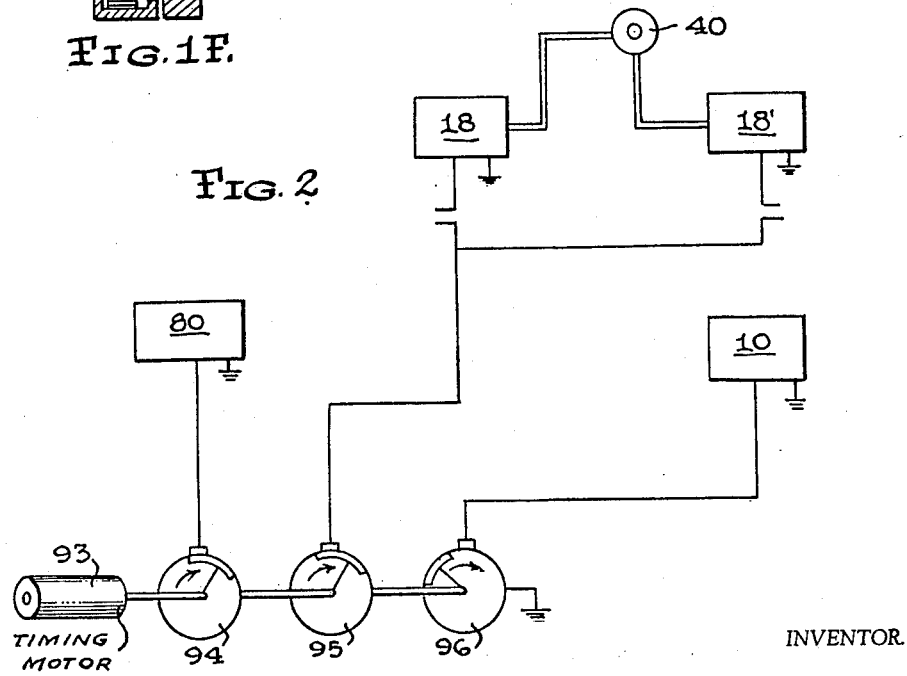

INVENTOR.
Otto John Munz

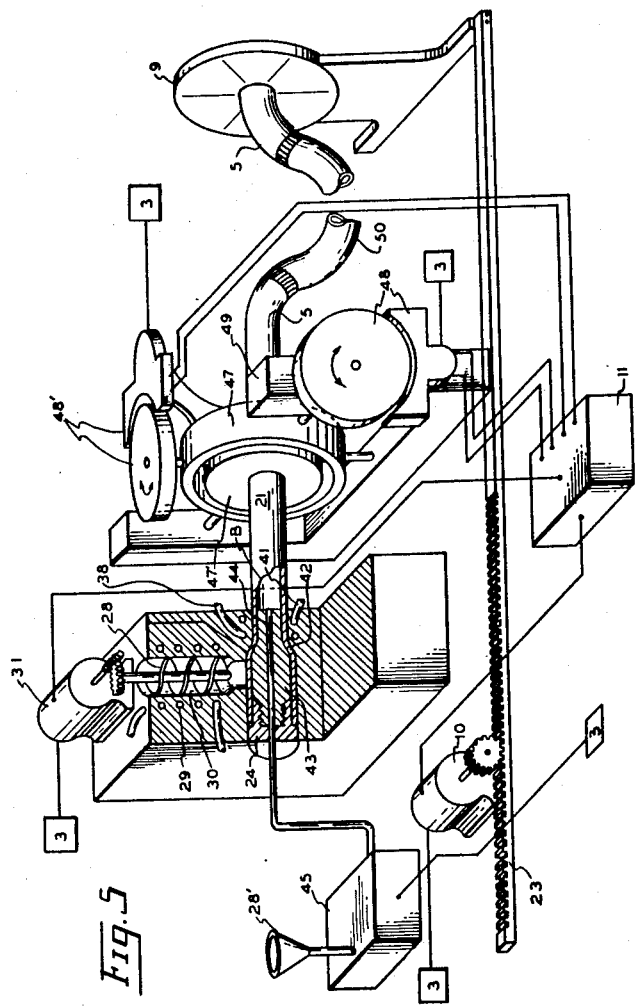

United States Patent Office 3,146,802
Patented Sept. 1, 1964

3,146,802
THREE-DIMENSIONAL LINEAR CAM, METHOD AND APPARATUS
Otto John Munz, Rte. 3, Harness Creek, Annapolis, Md.
Filed Aug. 6, 1959, Ser. No. 832,012
12 Claims. (Cl. 140—71)

The present invention relates to an apparatus and method for producing bodies, such as linear two- and three-dimensional cams, or linear two- or three-dimensional representations of functions of variables, and to a device actuated by such a linear cam for work performance.

This is a continuation-in-part of my copending U.S. patent application Serial No. 560,847, filed January 23, 1956, now Patent No. 2,911,538.

Conventionally cams are constructed in the shapes of rotary bodies developed in accordance with mathematical calculations to effect a tangent force.

An object of the invention is to provide an apparatus, capable of shaping directly in response to variable inputs a three-dimensional linear body for control of automatic programming and multiple motions of a machine tool.

Another object of the invention is to provide a cam following, work performing apparatus, which transmits the variable shapes of a linear cam, as it progresses therethrough, into output functions.

Another object of the invention is to employ simple but unprecedented principles for creation of simply shaped cam bodies to provide a novel engineering tool and creative means for research involving three-dimensional problems in time and distance.

Another object of the invention is to provide linear cams for predetermined automatic controls and steering of vehicles of any type, whether land-, water-, air-, including unmanned vehicles, such as missiles, trainers, torpedos, probes, guides, decoys, pilots, electrical relays, etc.

An object of the invention is to provide means for mass-producing component parts of three-dimensional wire networks, desirable for installation in electronic circuitries, for plotting purposes.

Yet another object of the invention is to provide a novel method and means of recording so as to increase man's ability to sense three-dimensional relationships in space, time, and distance of more complicated phenomena occurring in three or more dimensions, and to better comprehend pluralities of inter-related ideas and the combined quantitative or qualitative results of several phenomena.

Another object of the present invention is to provide an apparatus for display of information, such as values of mathematical functions, in three dimensions relative to two or more servo-root-plotters orthogonal reference axes, in response to variable signals derived for instance from radar indicators, optical scanners, analog mathematical function indicators, servo-root-locus plotters, etc.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURES 1B through 1F are details of construction of FIGURE 1.

FIGURE 2 is a circuit diagram of a sample network for use in conjunction with the operation of the apparatus of FIGURE 1.

FIGURE 5 is an isometric view of a work performing apparatus utilizing the apparatus shown in FIGURE 1, operating in feed-back as a cam follower.

Figure 1:
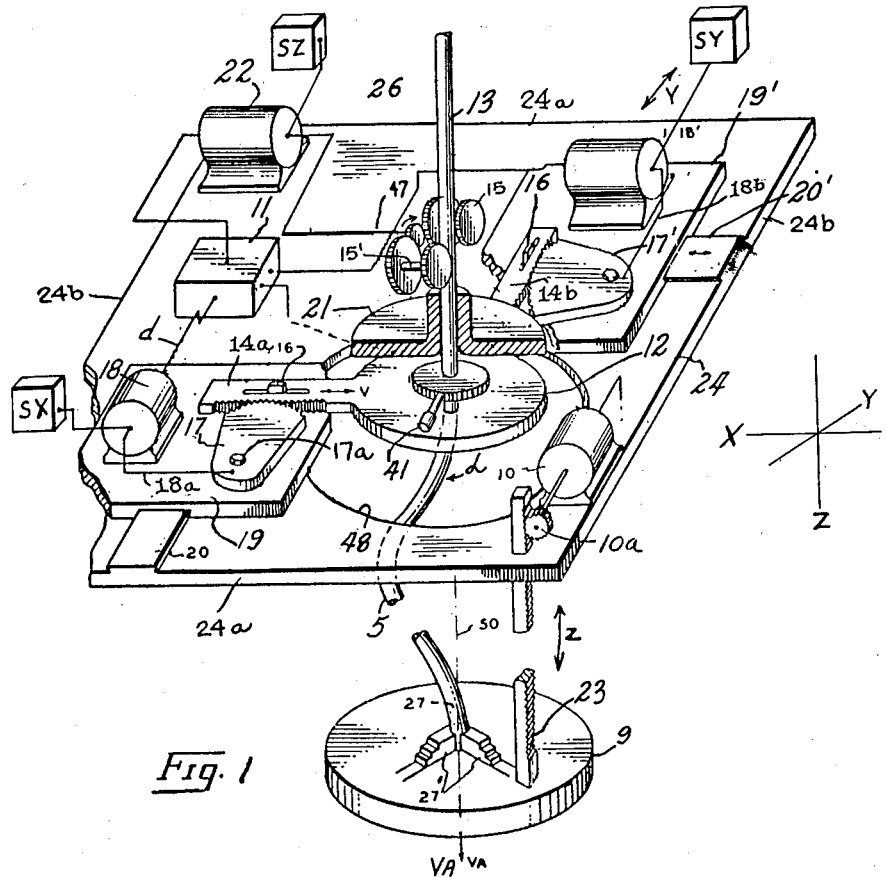
FIGURE 1 is an isometric view of the machine embodying the invention and adapted to deform a pliable wire 13 into a three-dimensional cam or graph.

Referring in detail to FIGURE 1, a base plate 24 generally rectangular in form is shown as positioned with its edges 24a and 24b parallel, respectively, with the x and y axes. A first guide 20 is fixed with plate 24 in a direction parallel with the y-axis. A slide 19 is channeled on its under surface to have a smooth, accurate fit over and about guide 20. As shown, the guide and channel may be of interfitting dove-tail cross-section, so that the slide 19 is positively restricted to smooth accurate translation only in a direction parallel with the y-axis.

Plate 24 also has a second guide 20′ fixed to its upper surface and extending in a direction parallel with the aforesaid x-axis. In a manner described in connection with slide 19 and guide 20, a second slide 19′ interengages with guide 20′ so that the slide is confined to translation only in a direction parallel with the x-axis.

A recording head 14, generally circular in form, has two mutually normal radial arms 14a and 14b projecting therefrom. As shown, each arm has a rack cut in one of its longitudinal edges. Arm 14a extends over slide 19 and by any suitable means, such as an elongated lug 16 having a smooth sliding fit in a slot in the arm, is guided for smooth accurate translation parallel with the x-axis. Likewise, arm 14b extends over slide 19′ and is connected therewith as at 16′, for smooth guided translation parallel with the y-axis. The head 14 itself is thus supported over an opening 48 in plate 24.

A gear segment 17 is journaled on slide 19 at 17a and its teeth mesh with those of arm 14a so that head 14 is shifted in a direction parallel with the x-axis, by and in proportion to the angular movement of the gear segment. At the same time, the entire plate 19′ and parts carried thereby are similarly translated along guide 20′. A reversible repeater motor 18 is mounted upon slide 19 and mechanically connected with segment 17 by any suitable means, represented at 18a, so that, to any desired scale, the segment is pivoted through an angle proportional to the rotation of motor 18. Likewise, slide 19′ carries a reversible repeater 18′ connected by a mechanical drive indicated at 18b with gear segment 17′ so that the segment is pivoted through an angle proportional to rotation of repeater motor 18′. In a manner obvious from the drawing and previous description, pivotal movement of sector 17′ also effects a corresponding translation of slide 19 along guide 20. In both cases, the angle of rotation of the gear segments and hence the translation of arms 14a and 14b and center of head 14 in directions parallel with the x- and y-axes, respectively, will thus be proportional to and a measure of the algebraic sum of the rotations of the respective motors from predetermined zero, datum or initial positions. Preferably, but not necessarily, the ratios of the two drives 18a and 18b will be the same, so that the radial distance, at any given time, of the center of head 14 from its preselected origin point is the vector resultant of the translations of slides 19 and 19′ along the respective coordinate axes.

A plate 9 has a central aperture with clamp means as indicated at 27′ by which the lower end of wire 13 may be secured centrally therein in direct vertical alignment with the previously-mentioned origin. The plate is carried or supported by a rack 23 fixed thereto at its lower end and projecting upwardly with a smooth fit through an aperture in plate 24. A follow-up or repeater motor 10, similar in construction to repeaters 18 and 18', is fixedly supported on plate 24 and has a drive pinion 10a fixed on its shaft, in mesh with rack 23. Of course it will be understood that any suitable reduction drive may be interposed between the shaft of motor 10 and rack 23. Thus, as the motor rotates, for example, as a function of time, plate 9 is correspondingly lowered and moves the wire downwardly through head 14.

A plate 21 has a central axial projection 21a upstanding therefrom and provided with a bore affording a smooth sliding fit for wire 13. The plate is fixed with base plate 24 in position such that the axis of the aforesaid bore is in vertical alignment with and passes through the origin, previously identified.

Follow-up motors, servo-motors, or repeater motors, such as shown at 22, 18, 18' and 10, control dispensing of wire 13 through a deforming head 14, in response to variable signal means. The variable signals are produced by any preselected variable means SX, SY, SZ singly, or in any combination independently of time, or time or position dependent.

The variable signal means may be, for instance, pressure-, temperature-, speed- or change in geometrical position-detectors, scanners such as radar, an optical scanner, a mathematical function indicator, a servo-root-locus plotter, a potentiometer, a differential transformer, a transducer or any other variable random signal source.

A computer 11 calculates the inputs to motors 18 and 18' in order to deliver a greater or smaller supply of wire to the recording head. In this way, variations in length of wire actually fed through the instrument as required to provide the length required in accordance with the amount of bending effected.

Thus, as wire 13 is fed downwardly through plate 21 by continuous downward motion of plate 9, and as plate 14 is deflected by motors 18 and 18' in a direction and radial distance from the origin equal to the resultant of the two component variables along the respective x- and y-axes, the wire 13 is bent into element 5 so that any increment of length thereof is deflected in a corresponding direction and by a corresponding radial distance from the z-axis. The wire thus takes the form of a three-dimensional graph 5, each point of which represents to scale the instantaneous value of each variable measured along the respective axes.

Figure 1B:
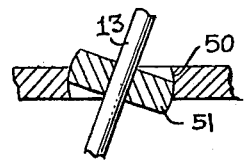
Figure 1A:
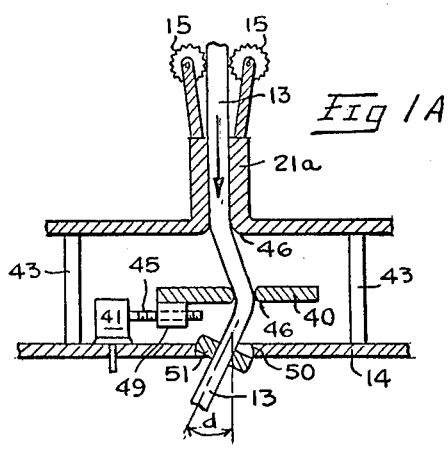
FIGURE 1A is a vertical axial cross-section to an enlarged scale, of the deforming plate and mechanism by which it is shifted to deform the wire.

As an alternative construction, FIGURE 1A shows plates 14 and 21 held in fixed parallel spaced relation by columns 43. Deforming plate 40 is mounted between plates 14 and 21 and has a central aperture with rounded edges, as shown, through which wire 13 passes with a smooth fit.

The deforming disk 40 has threaded lugs fixed to its under side, such as the one shown at 49. A second threaded lug, not shown, has its axis at right angles to that of lug 49. A pair of follow-ups or repeaters 41 and 42 are mounted upon plate 14 and the shaft of each is threaded to threadedly engage a corresponding one of the lugs such as 49. Thus, the axis of the shaft of motor 42 is parallel with the x-axis and that of motor 41 is parallel with the y-axis. Furthermore, motor 41 is mounted upon plate 14 by any suitable guide means so that it may have translation only relatively to the plate, in a direction parallel with the x-axis. Likewise, motor 42 is mounted upon plate 14 so that it may have translation only relatively thereto in a direction parallel with the y-axis. Motor 41 is connected with motor 18 to be operated synchronously therewith. Motor 42 is likewise driven in synchronism with motor 18'. The connections are such that motors 18 and 41 act to drive their elements 14 and 40, respectively, always in the same direction. The same is true of motors 18' and 42.

In the species being described, plate 14 has a central aperture 50 with edges formed as the equatorial portion of a sphere with center at the center of the aperture.

A tilting element 51 has its edges correspondingly shaped to fit the aperture in plate 14 for universal pivotal movement relatively thereto through limited angles, and is provided with a central hole accommodating wire 13 with a smooth sliding fit. The element 51 therefore pivots to accommodate itself to a position normal to the direction of the increment of wire instantaneously traversing it. Alternatively element 51 may be pivotally mounted in a gimbal ring which in turn is pivoted to plate 14 on an axis normal to its pivotal axis with the element, both pivot axes being normally in the plane of the plate.

In operation, due to the combined cumulative movement of head or plate 14 relatively to base plate 24, and of deforming element 40 relatively to plate 14, an accurate deformation of wire 13 to form a graph record of the selected variables is assured.

As an alternative additional feature, the drive wheels 15, mounted on shafts 15' suitably supported on hub 21, having knurled or frictional surfaces pressed against the glyph wire, drive generator 22 through gear train 47, thereby furnishing an output voltage in proportion to the forming speed of the glyph, which is the vector sum of the derivatives of the x, y and z inputs. If the motion of a moving object were being plotted, the output voltage of generator 22 would represent the absolute magnitude of its instantaneous velocity with respect to the starting point, and angle, as shown in FIGURES 1A and 1B, which could be measured and recorded by means obvious to those skilled in the art, for example, in terms of the displacement of disk 40 relative to recording head 14, would represent the instantaneous vector direction of motion.

Figure 1C:
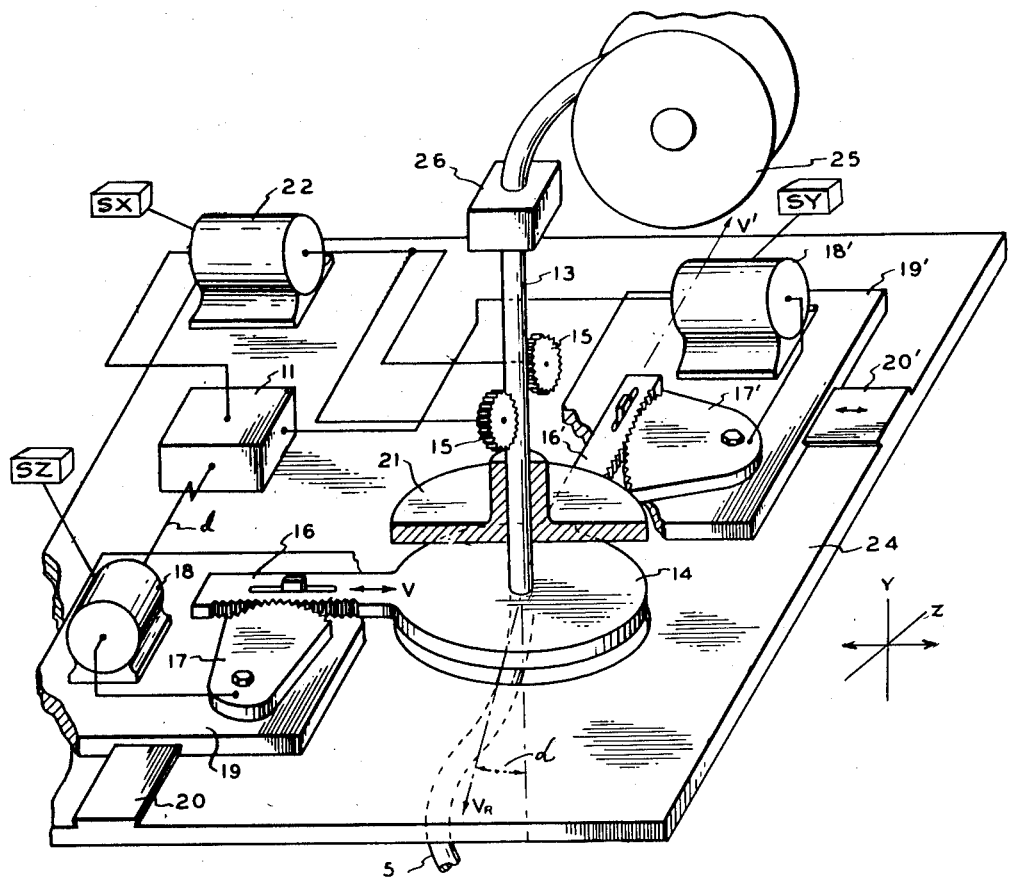

In FIGURE 1C the signal source T, motor 10 and associated elements such as rack 23 and plate 9 are omitted, so that the cam protrudes freely.

There are many other possible applications of the invention to problems involving curvilinear motion in a space-time continuum, which depend on minor design changes to accommodate different input data available. All such applications are to be considered as within the scope of the invention.

In FIGURES 1D, 1E and 1F is shown a modification in which tracks 81 and 82 are positioned in horizontal parallelism just below forming element 40. These tracks are C-shaped in cross section and each one supports a respective carriage 87 and 88 by means of rollers fitting the tracks. Each carriage has a bracket supporting a solenoid such as 80, having an armature 86, FIG. 2, linked to a brake or holding member 83, shown in perspective in FIGURE 1E, as having a V-notch 84 and a depending arm 85 and hinge pivot 88 by which the member is hinged to its respective carriage.

A pair of gripping rods 90, 91 are supported at their respective ends in the carriages so that they may move in parallelism toward and from each other. A light spring at each end, not shown, urges these gripping rods apart.

Wire 13 passes between rods 90 and 91, which may have their confronting edges serrated as shown. Likewise the depending flanges of tracks 81 and 82 may have serrated edges, such as 81a shown for track 81 at FIG. 1D.

As the solenoids are energized simultaneously, they act upon their armatures to pivot elements 83 downwardly so that the notches therein engage over the rods 90, 91 urging them together to clamp wire 13 therebetween. At the same time arm 85 integral with clamp member 83 moves upwardly into contact with the serrated or notched edge of its channel track to thereby lock the carriages in position and consequently to fix wire 13 in the precise position to which it has been moved.

In this form of the invention a timing motor 93 rotates a set of timing disks 94, 95 and 96. Disk 94 controls solenoids 80, disk 95 controls motors 18 and 18' having the functions previously described, and disk 96 controls motor 10 also operating as previously described. The cycle is such that solenoids 80 are first energized to clamp the wire in the position to which it was moved during the previous cycle. At the same time the circuits to motors 18 and 18′ are closed so that they may rotate under control of the respective variables to which they are responsive and correspondingly shift deforming disk as described for the previously-disclosed embodiments. Following opening of the circuits to solenoids 80 which is effected substantially simultaneously with the opening of the circuits to motors 18 and 18′, disk 96 is rotated into position closing the circuit to motor 10 to feed a new increment of wire downwardly. It is contemplated that a cycle may have a duration of about one second so that the operation is smooth and practically continuous and the wire is deformed accurately in accordance with the desired function since, during bending that portion previously formed is rigidly held against further deformation by disk 40.

For example, if the velocity and direction of the motion were known, the known velocity data could drive generator 22 as a motor, and the directional data could position deforming disk 40, wheels 15 could drive the glyph wire downwardly through the deforming disk and recording head, and the rate motors 18, 18′ and 10 would function as generators to provide output voltages representing the $x$, $y$ and $z$ Cartesian coordinates of the motion.

The linear orientation exerted upon the shaped wire glyph by the block 9 as it increases its distance from the main apparatus is optional. It may be utilized to impress upon the glyph an additional information, in which case the block itself may be subjected to movements along the $x$ and $y$ coordinate axes by additional means and motors analogous to those described above under 16 through 22. The block 9, however, may be omitted as shown in FIG. 1C. The glyph wire upon completion of its shaping may be inserted into a base provided with a three-dimensional reference system, or a tool-guiding head such as described hereinafter in a later figure, a control panel of a vehicle, etc.

In order to effect significant bending of the wire 13 of FIGURE 1 it is advantageous to hold or grip it firmly a little below deforming disk 40, such as by two spaced tracks parallel in a plane parallel to the X—Y plane. A carriage mounted on the tracks for pure translation therealong includes two parallel gripping rods with wire 13 passing between them. The carriages have solenoid-operated means to (1) force the rods together to grip the wire and at the same time (2) to lock the carriages to the tracks. The follow-ups 10, 18 and 18′ are operated in pulses rather than continuously. A cycle of only a few seconds is (a) motor 10 or its equivalent energized to feed an increment of wire downwardly, (b) de-energization of motor 10, (c) energization of the above-mentioned solenoid means to grip the contiguous portion of the wire and to hold it firmly in position, (d) energization of motors 18 and 18′ to effect any shifting of disc 40, (e) de-energization of motors 18 and 18′ followed by (f) de-energization of the solenoid means. Following step (f) there is a pause of a fraction of a second to give the wire time to take up its new position, if any, and to correspondingly move or shift the carriage and the position of the wire between the gripping or clamp rods. Then a new cycle starts.

Figure 3:
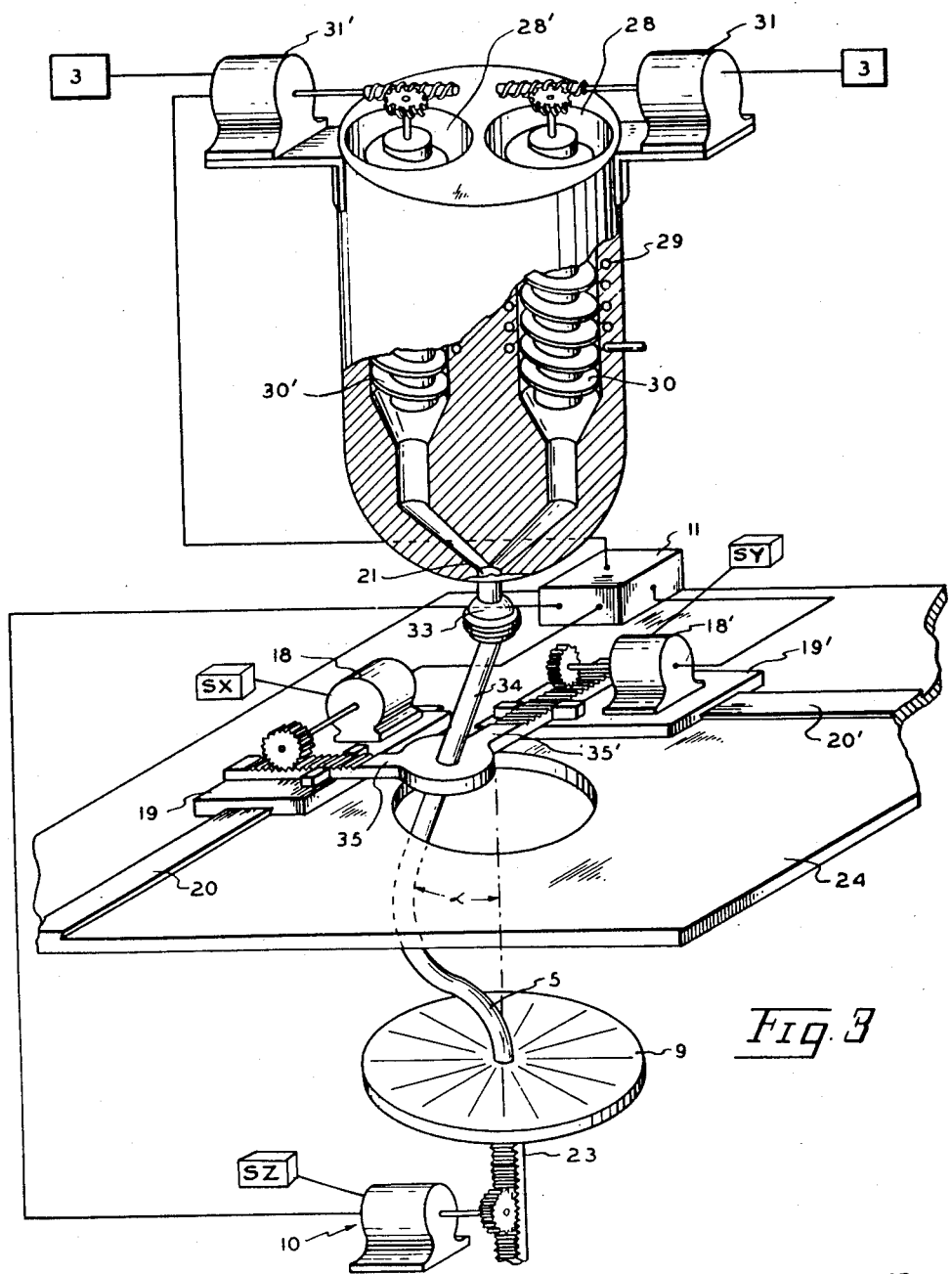
FIGURE 3 is a view of another embodiment of the cam producing apparatus of the invention.

The apparatus shown in FIGURE 3 is devised for continuous recording and increases substantially the number of additional phenomena which may be recorded simultaneously. This apparatus fabricates its own web 13 from loose or plastic materials, such as thermoplastic or thermosetting organic or inorganic materials.

The invention is shown here employing two commercial extruders. The main elements of such an extruder are a funnel 28, preferably equipped with heating coils 29, and a feed screw 30. The glyph material which is usually in pellet, powder, amorphous or other freely moving form is forwarded by the feed screw 30, driven by driving mechanism 31, through a fixed guide 21. The guide 21 terminates in a universal pipe joint 33, having a glyph-forming tube 34, controlled by a recording head which comprises rack-arms 35 and 35′. The tube 34 is capable of universal movements within a predetermined radius. The mechanical construction of the recording head and its activating members is quite similar to that of FIGURE 1. The same reference numbers are used as in FIGURE 1 and the operation is the same. This apparatus shows the possibility of the interchangeable use of two extruders, each feeding differently colored material. One or more than two extruders may be used in this apparatus. Thus, while the continuous path of the glyph is predetermined by three phenomena translators, the color of the glyph produced may be changed in accordance with additional phenomena to be recorded. Each of the extruders may be actuated by these phenomena interchangeably. It is possible to let both of them or all of them work simultaneously and decrease the feeding speed of each proportionately to deliver the correct amount of the combined glyph materials through a common guide 21 to the pipe joint 33. This can be taken care of in the synchronizer 11.

The apparatus shown in FIGURE 5 illustrates another possibility of carrying out the method of the present invention. It involves a horizontal method of recording although it is not restricted to such a positioning. This apparatus is primarily designed for the recording of continuous phenomena together with interrelated occasional phenomena. The glyph-forming head uses a gimbal mechanism mounted in frame 49, capable of universal movements within the limits of the recording space. The outer gimbal ring 47, controlled by translator 48, is mounted for angular movements about a horizontal axis, and the inner gimbal ring 47′, controlled by translator 48′, is mounted for movements about a vertical axis. The translators shown are of the electro-magnetic rotor-stator type. The translator 48′ is mounted on the outer gimbal ring 47 and moves with it. The inner gimbal ring 47′ has a central opening through which the web 21 proceeds and where it is deviated horizontally and vertically by the combined action of the two gimbal rings. The formed glyph is carried away from the recording head in the direction of the recording axis by carrier 9, which in turn is controlled by rack 23 through carrier control 10. The web is fabricated during recording in the form of a transparent tube by an extruder 30, receiving the glyph material from one or more funnels 28 and controlled by material-advance control 31. The extruder is positioned in preheating coils 29. The plasticized material is extruded into a conical tubular chamber 42, the inner walls of which are defined by a die 43, threaded into the frame of the apparatus 24, to form a tube. Said die is centered within the tubular channel and has a central bore 44 connected by a tube to another phenomenon propagating mechanism, such as another extruder, pump, injector or equivalent, indicated by numeral 45. Such a mechanism may have its own material advance control, starting with a funnel 28 and continuing with features substantially as described above with reference to the previous figures. Each of the main recording elements, that is to say, the carrier, the two gimbal controls, the tubular extruder, and the mechanism 45 are actuated by separate phenomenon translators 3, and the motions of some of these elements may be synchronized at 11, if necessary. The occasional phenomenon to be recorded is connected through its translator with the injection apparatus 45. The cone of the chamber 42 may be positioned within a coil 41 which circulates a medium for fixing the formed tube before recording. Such a fixing might involve precooling through inlet 38. If this arrangement is used, as shown in FIGURE 5, the glyph material is advanced in plasticized state through the extruder 30 to form the transparent glyph-web in the form of a tube. The tube is precooled by cooling coils 41, yet retains a deformability sufficient to yield to the shaping deviations of the gimbal system. Simultaneously, the mechanism 45, which is controlled by an occasional phenomenon occasionally injects or extrudes into the tube through 44 another material, sufficiently dark to make it visible against the transparent tube. The continuous glyph together with its inside record is then carried away by the carrier into the recording space.

The glyph carrier in any of the above described apparatuses may be subjected to the control of additional phenomenon translators for additional relative motions with reference to the recording head, as explained before. Thus, a considerable number of additional phenomena may be recorded simultaneously for correlation with one another. Also, several recording heads may record simultaneously in the same recording space, making use of parallel axes. The cross section of the glyph may be in the form of an infinitesimal trace or may be of any desired larger form and of any geometrical shape. Means may be incorporated to change the cross-section during recording in response to variable phenomena.

The apparatus 45 in FIGURE 5 may be an acoustic or sonic source, propagating sound vibrations or compression waves through the tube. The beginning of the tube may be sealed off by the carrier mounting, shown in FIGURE 1 under numeral 27, or the carrier may have a central opening, keeping the orifice of the tube open. Sound vibrations or compression waves initiated at 45 will pass through the tube, leaving reflections on its inner and outer surfaces at the point where the tube is still in a plastic condition during precooling at 41. Thus the tube surface will constitute a record of sound vibrations or of compression waves. In this instance the gimbals may remain inactive, or not, or may be eliminated entirely. Such recording may prove useful in a novel sound investigation and in supersonic research and practice.

Figure 4:
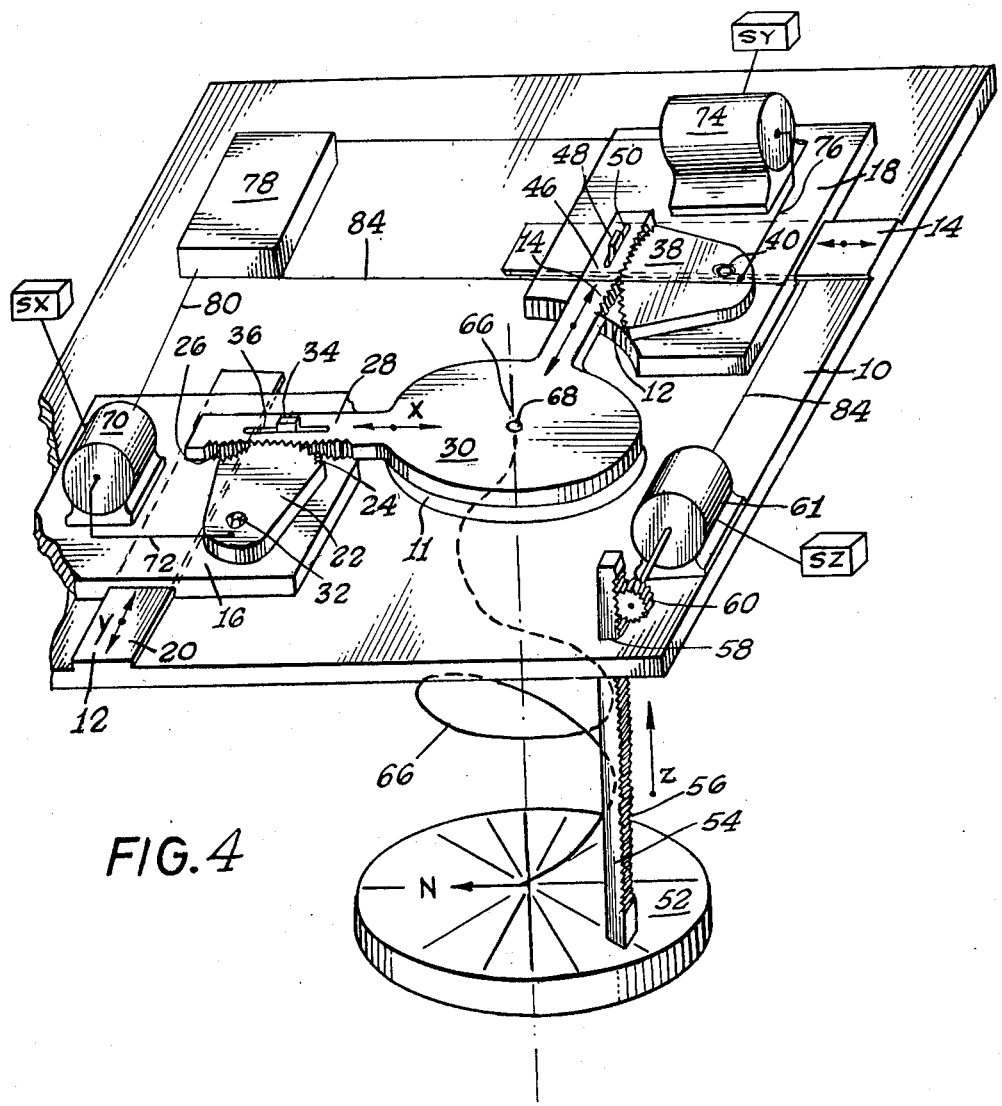
FIGURE 4 is a view of another embodiment of the cam-producing apparatus of the invention.

As shown in FIGURE 4 the apparatus of FIGURES 1, 3, and 5 may be reversed, which is shown by example with reference to FIGURE 1. A three-dimensional cam preformed by any method described above is fed in reverse along the z axis through the head 21 whereby movements of racks and gears 14 and 17 are caused, which in turn generate electrical impulses to be fed into motors 18 and 18' proportional to the respective movements, so as to actuate machinery and to duplicate phenomena represented by the cam. The cam is shown fed vertically upward by gear and rack operated by motor 12, either continuously or in response to some associated reference phenomena.

All reference herein to x-axis, y-axis or z-axis are to a system of position determining based on the Cartesian coordinates.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

I claim:

1. A machine for controllably bending a length of permanently deformable wire to form a three-dimensional cam comprising a base, a deforming plate having an aperture through which said wire slides with a smooth fit, power-driven means engaging said wire above said base and operable to longitudinally translate said wire in a first direction through said plate, power-driven means carried by said base and operable to move said plate discretely in mutually normal second and third directions, said second and third directions determining a plane normal to said first direction at said plate, and means controlling the operation of all said power-driven means independently to permanently bend and deform said wire as it traverses said plate.

2. In a machine for controllably bending a length of permanently deformable wire to form a three-dimensional cam, a base through which said wire is movable in a first direction, first and second slides, first guide means between said first slide and base and guiding said first slide for translation only relatively to said base in a second direction normal to said first direction, second guide means between said second slide and base and guiding said second slide for translation only relatively to said base in a third direction normal to both said first and second directions, first power-driven means operable to advance said wire through said base in a straight pass and at a variable rate, second power-driven means caried by said first slide and operable to engage and variably deflect and bend said wire in a plane determined by said first and second directions, third power-driven means carried by said second slide and operable to engage and variably deflect and bend said wire in a plane determined by said first and third directions, and control means operating all said power-driven means in accordance with the respective instantaneous component magnitudes of a variable.

3. A machine as in claim 2, power-operated clamping means operable to engage and clamp said wire at a point immediately subsequent to the point of bending, a power-operated timer, and discrete contact means driven by said timer and energizing said clamping means and said first, second, and third power-driven means, in predetermined cyclical sequence.

4. A machine as in claim 3, said clamping means comprising a pair of spaced parallel tracks in a plane normal to said first direction, a carriage mounted on and by said tracks for translation therealong and including spaced gripping elements movable toward each other to grip said wire passing therebetween, and means energizable by said power-operated timer to move said gripping elements simultaneously, equally, and oppositely, into gripping relation with said wire.

5. In a machine for forming a three-dimensional wire cam, first means feeding a straight pass of permanently bendable wire in a first direction longitudinally of said pass, second means operable to engage said wire adjacent said pass and deflect and independently bend the same in respective ones of two mutually normal component directions both in a plane normal to said pass, third means operable to periodically grip said wire at a point spaced from said second means in the direction of feed of said wire, to hold the same undeflected at said point, and timing means operating said first, second and third means in predetermined time sequence.

6. An apparatus for the production of a rigid multidimensionally deflected elongated element in accordance with and representing a function of at least two random variables, comprising, a first variable signal means, a first means controlled by said first variable signal means to propagate said element in a linear path in a first direction of its length at a controlled rate of speed, at least one second variable signal means, at least one second means operable independently from said first means and controlled by said second variable signal means to variably deflect said element at a predetermined point of its advance in said first direction, in at least one controlled second direction at an angle to said first direction for a variable distance thereof, and simultaneously with said first means, and means continuously operating said first and said at least one second means in accordance with respective coordinated instantaneous values of said random variables to variably deflect said element in at least one plane relative to a reference axis thereof, said axis determined by said first direction.

7. An apparatus as claimed in claim 6, wherein said multidimensionally deflected element is a rigid wire.

8. An apparatus as claimed in claim 6, simultaneously operable as a cam follower, further including means engaging said element as a cam at a point away from its terminal end, power-driven means operable in a longitudinal direction opposite to said first direction to drive said cam in reverse through said plate, and to move said plate in said second and third directions to cause it to follow the deformations of said cam.

9. In an apparatus for forming three-dimensional linear cams from a length of permanetnly-deformable wire-type material as a function of their variables, first power-driven means operable to continuously advance said material in a straight pass longitudinally in a first direction, deforming means engaging said material at a point in said pass and movable only in second and third mutually-normal directions in a fixed plane perpendicular to said first direction, to correspondingly bend said material as it traverses said point under operation of said first power-driven means, second power-driven means connected with said deforming means, to operate the same in a second direction in said plane, third power-driven means connected with said deforming means to operate the same in said third direction in said plane and normal to said second direction, and means controlling the operation of said first, second, and third power-driven means in accordance with the respective instantaneous values of the three variables.

10. An apparatus for the production of a rigid multi-dimensionally deflected elongated element in accordance with and representing a function of at least two random variables, comprising, a first means to propagate said element in a linear path in a first direction of its length at a controlled rate of speed, at least one second means operable independently from said first means to variably deflect said element in at least one controlled second direction at an angle to said first direction for a variable distance thereof, and simultaneously with said first means, and means operating said first and said at least one second means in accordance with respective coordinated instantaneous values of said random variables to variably deflect said element in at least one plane relative to a reference axis thereof, said axis determined by said first direction.

11. An apparatus as claimed in claim 10 simultaneously operable as a cam-follower, said apparatus including a third means to propagate said elongated element, formed into a rigid multidimensional cam, in a third direction reverse to said first direction, said at least one second means operable to yield to the deflecting pressures of the said cam propagated in reverse direction, said second and third means operable to produce output signals respectively in accordance with instantaneous coordinated vector values represented by said cam.

12. An apparatus for controllably deforming a rigid linear element in accordance with a function of three random variables, comprising, first means to propagate said element in a linear path in the direction of its length and at a controlled variable rate of speed in response to a first random variable, said linear path representing a reference axis, second means to deflect said element continuously at a reference point in its said path in a second direction at an angle to the first direction at a variable rate of speed for a variable length thereof in response to a second variable, third means operable independently of said first and said second means to deflect said element at a variable rate of speed in a variable length thereof at said reference point in a direction angular to said first direction and to said second direction in response to a third random variable, and means operating said first, second and third means independently of one another and in response to instantaneous values resulting from variations in said random variables to deflect said element into a functional representation of said variables, having a reference axis common with said linear path.

References Cited in the file of this patent

UNITED STATES PATENTS

| | | |
|---|---|---|
| 689,575 | Church | Dec. 24, 1901 |
| 1,250,252 | Wadsworth | Dec. 18, 1917 |
| 1,823,680 | Curtiss | Sept. 15, 1931 |
| 2,202,275 | Tulloch | May 28, 1940 |
| 2,267,409 | Massini | Dec. 23, 1941 |
| 2,517,142 | Staley | Aug. 1, 1950 |
| 2,609,192 | Lermont | Sept. 2, 1952 |
| 2,844,171 | Kuba et al. | July 22, 1958 |
| 2,855,159 | Malina | Oct. 7, 1958 |
| 2,862,670 | Malina | Dec. 2, 1958 |
| 2,969,827 | Rosenthal | Jan. 31, 1961 |
| 3,025,891 | Clay | Mar. 20, 1962 |